United States Patent Office 3,324,129
Patented June 6, 1967

3,324,129
QUINOLINE DERIVATIVES
Jean Gaston Baget, Sceaux, Seine, France, and Pierre Sarret, deceased, late of Fontenay-sous-Bois, Seine, France, by Jacques Maurice Thouvent, legal representative, Fontenay-sous-Bois, Seine, France, assignors to Rhone-Poulenc S.A., Paris, France, a corporation of France
No Drawing. Filed Nov. 12, 1964, Ser. No. 411,678
Claims priority, application France, Nov. 26, 1963, 955,044
4 Claims. (Cl. 260—268)

This invention relates to new therapeutically useful quinoline derivatives, to processes for their preparation and to pharmaceutical compositions containing them.

According to the present invention, there are provided the quinoline derivatives of the general formula:

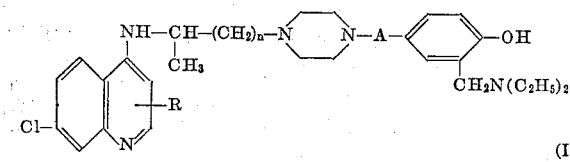

(I)

wherein R represents a hydrogen atom or an alkyl group having 1 to 4 carbon atoms in the 2- or 3-position of the quinoline nucleus, n is an integer not greater than 4, and A represents a straight or branched alkylene chain having 2 to 6 carbon atoms, and acid addition salts thereof. The compounds of Formula I can exist in the form of optically active isomers and racemates, and the invention includes all such forms of the compounds.

According to a feature of the invention, the quinoline derivatives of Formula I are prepared by the process which comprises reacting a piperazine derivative of the formula:

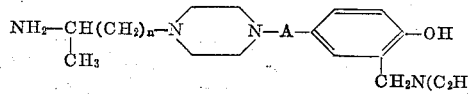 (II)

(wherein A is as hereinbefore defined) with a quinoline compound of the formula:

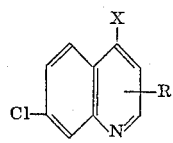

(III)

wherein X represents a reactive atom or grouping, such as a halogen (preferably chlorine or bromine) atom or a phenoxy group, and R is as hereinbefore defined. The reaction may be effected with or without an inert organic solvent medium in the presence or absence of a condensing agent. Preferably it is carried out by heating the reactants in an inert organic solvent having a high boiling point, such as an aromatic hydrocarbon (e.g. xylene), an amide (e.g. dimethylformamide) or phenol, at a temperature within the range 100°–250° C.

According to a further feature of the invention, the quinoline derivatives of Formula I are prepared by the process which comprises reacting a phenol derivative of the formula:

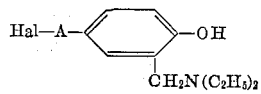 (IV)

(wherein Hal represents a halogen atom and A is as hereinbefore defined) with a quinoline compound of the formula:

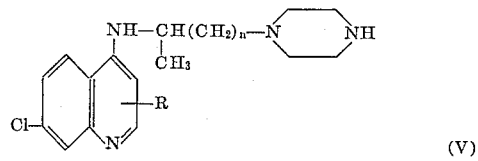

(V)

wherein R and n are as hereinbefore defined. The reaction is advantageously effected in an inert organic solvent, such as an aromatic hydrocarbon or ketone, in the presence of an acid-binding agent, preferably an alkali metal compound or a tertiary amine. The reaction is conveniently carried out at the boiling temperature of the solvent employed.

According to a still further feature of the invention, the quinoline derivatives of Formula I are prepared by the process which comprises reacting a piperazine derivative of the formula:

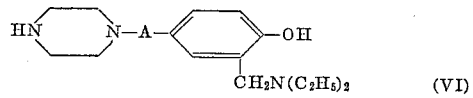 (VI)

(wherein A is as hereinbefore defined) with a quinoline compound of the formula:

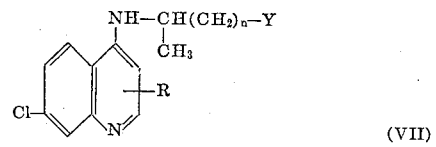

(VII)

wherein Y represents the acid residue of a reactive ester such as a halogen atom or the residue of a sulphuric or sulphonic acid ester, in particular a methanesulphonyloxy, benzenesulphonyloxy or toluene-p-sulphonyloxy group, and R and n are as hereinbefore defined. The reaction is advantageously effected in an inert organic solvent, for example an aromatic hydrocarbon, an alcohol or ketone, preferably at the boiling temperature of the solvent employed, in the presence of an acid-binding agent.

The new quinoline derivatives of Formula I may be converted by methods known per se into acid addition salts. Thus, the acid addition salts may be obtained by the action of an acid on the quinoline derivative in an appropriate solvent such as an alcohol, an ether, a ketone, or water. The acid addition salt which is formed is precipitated, if necessary after concentration of its solution, and is separated by filtration or decantation.

The quinoline derivatives of the present invention and their non-toxic acid addition salts possess useful chemotherapeutic properties. They are, in particular, useful as antimalarials, anthelmintics and amoebicides either as prophylactic or curative agents. Preferred compounds of the invention are those of Formula I in which n represents 1; in particular 1-[2-(7-chloro-4-quinolyl)amino-propyl]-4-[2-(3-diethylaminomethyl-4-hydroxyphenyl)ethyl]piperazine and non-toxic acid addition salts thereof.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, oxalates, maleates, theophylline-acetates, salicylates, phenolphthalinates, methylene-bis-β-hydroxynaphthoates (also known as embonates), resorcylates, gentisates and p-hydroxyisophthalates) so that the beneficial physiological properties inherent in the bases are not vitiated by side-effects ascribable to the anions.

The following example illustrates the preparation of compounds of the present invention.

*Example I*

A mixture of 1-[2-(3-diethylaminomethyl-4-hydroxyphenyl)-ethyl]piperazine (30.5 g.), 2-(7-chloro-4-quinolyl)amino-1-chloropropane (25.5 g.), methyl ethyl ketone (200 c.c.), triethylamine (10.7 g.) and dry sodium iodide (15 g.) is heated under reflux with stirring for 8 hours. After cooling, the insoluble matter is filtered off and washed with methyl ethyl ketone (100 c.c.). The solvent is distilled off in vacuo (30 mm. Hg) on a water-bath at 50° C. and the reidue obtained is taken up in methylene chloride (500 cc.) and water (100 cc.). The organic layer is decanted and the solvent distilled off on a water bath. The viscous oil obtained is extracted with benzene (300 cc.) with gentle warming on the water-bath and then decanted while warm to separate insoluble matter. The benzene from this extract is distilled off in vacuo (30 mm. Hg) on a water-bath at 50° C. There is thus obtained a brown oil (38 g.), and this crude base is purified by conversion to the picrate in ethyl acetate.

The picrate is reconverted to the base which is then transformed into the oxalate by dissolution in methanol (50 cc.) and the addition of a solution of anhydrous oxalic acid (8.5 g.) in methanol (50 cc.). After 18 hours the crystalline precipitate is filtered off and washed with diethyl ether (total 50 cc.). After drying at 65° C. in vacuo (0.05 mm. Hg), the trioxalate of 1-[2-(7-chloro-4-quinolyl)amino - propyl]-4-[2-(3 - diethylaminomethyl-4-hydroxyphenyl)-ethyl]piperazine (19 g.), M.P. 130–135° C., is obtained.

The 1-[2-(3-diethylaminomethyl - 4 - hydroxyphenyl) ethyl]-piperazine [N percent (found protometrically): 14.25, calculated: 14.43] employed as starting material in the above example is prepared from 1-benzyl-4-[2-(3-diethylaminomethyl - 4 - hydroxyphenyl)ethyl] - piperazine [N percent (found protometrically): 10.54, calculated: 11.02] (47 g.), itself prepared from 1-benzyl-4-[2-(4-hydroxyphenyl)ethyl]piperazine (38 g.), M.P. 135° C., anhydrous diethylamine (10.3 g.) and a 30 percent formalin solution (19 g.). The 1-benzyl-4-[2-(4-hydroxyphenyl)-ethyl]-piperazine is obtained from 4-(2-iodoethyl)phenol (70 g.) and 1-benzylpiperazine (46 g.).

The present invention includes within its scope pharmaceutical preparations containing, as active ingredient, at least one of the quinoline derivatives of Formula I, or non-toxic acid addition salt thereof, in association with a pharmaceutical carrier or coating. The invention includes especially such preparations made up for oral, parenteral or rectal administration.

Solid compositions for oral administration include tablets, pills, dispersible powders, and granules. In such solid compositions one or more of the active compounds is, or are, admixed with at least one inert diluent such as calcium carbonate, wheat or potato starch, alginic acid, sucrose or lactose. The compositions may also comprise, as is normal practice, additional substances other than inert diluents, e.g. lubricating agents, such as magnesium stearate, and wetting, sweetening and perfuming agents. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring and preserving agents. The compositions according to the invention for oral administration, also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or a suitable wax base.

The percentage of active ingredient in the preparations of the invention may be varied, it being necessary that it should constitute a proportion such that a suitable dosage shall be obtained. The dosage depends on the desired therapeutic effect, on the route of administration and on the duration of the treatment. The dosages are generally between 1 and 25 mg. per kilogramme of animal weight. In human therapy the compositions should generally be administered so as to give in the case of oral administration, between 0.1 and 1.5 g. of active substance per day.

The following example illustrates pharmaceutical compositions according to the invention.

*Example II*

Tablets are prepared having the following composition:

|  | Mg. |
|---|---|
| 1-[2-(7-chloro - 4 - quinolyl)amino-propyl]-4-[2-(3-diethylaminomethyl - 4 - hydroxyphenyl) - ethyl] piperazine trioxalate | 333 |
| Starch | 200 |
| Colloidal silica | 47 |
| Magnesium stearate | 20 |

We claim:

1. A quinoline derivative selected from compounds of the formula:

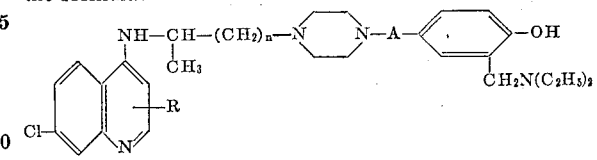

wherein R represents a member of the class consisting of hydrogen, and alkyl having 1 through 4 carbon atoms in one of the 2- and 3-positions of the quinoline nucleus, $n$ represents an integer 1 through 4, and A represents an alkylene chain having 2 through 6 carbon atoms, and non-toxic acid addition salts thereof.

2. A quinoline derivative according to claim 1 wherein $n$ represents 1.

3. A quinoline derivative according to claim 2 wherein R represents hydrogen.

4. A member of the class consisting of 1-[2-(7-chloro-4 - quinolyl)amino - propyl]-4-[2-(3-diethylaminomethyl-4-hydroxyphenyl)ethyl]piperazine and non-toxic acid addition salts thereof.

References Cited

UNITED STATES PATENTS

| 3,101,338 | 8/1963 | Robinson | 260—268 |
| 3,126,384 | 3/1964 | Gailliot et al. | 260—268 |
| 3,230,223 | 1/1966 | Baget et al. | 260—268 |

ALEX MAZEL, *Primary Examiner.*

HENRY JILES, *Examiner.*

J. W. ADAMS, *Assistant Examiner.*